United States Patent [19]
Tuffen

[11] Patent Number: 5,495,370
[45] Date of Patent: Feb. 27, 1996

[54] SURVEILLANCE DEVICES

[75] Inventor: John Tuffen, Essex, United Kingdom

[73] Assignee: Advance Visual Optics Ltd., Colchester, United Kingdom

[21] Appl. No.: 181,057

[22] Filed: Jan. 14, 1994

[30] Foreign Application Priority Data

Jan. 15, 1993 [GB] United Kingdom ............... 9300758

[51] Int. Cl.$^6$ ................ G03B 17/48; G03B 23/08; G03B 5/08
[52] U.S. Cl. ................ 359/402; 359/401; 359/403; 359/405
[58] Field of Search ................ 359/399, 400, 359/401, 402, 405, 857, 862, 403

[56] References Cited

U.S. PATENT DOCUMENTS

| | | | |
|---|---|---|---|
| 784,852 | 3/1905 | Goerz | 359/401 |
| 1,452,263 | 8/1936 | Belden . | |
| 3,796,478 | 3/1974 | Dierkes | 359/407 |
| 3,801,187 | 4/1974 | McMichael | 350/301 |
| 4,161,352 | 7/1979 | Felix et al. | 359/862 |
| 4,580,886 | 4/1986 | Hajnal | 359/402 |
| 4,644,845 | 2/1987 | Garehime, Jr. | 89/41.05 |
| 4,977,323 | 12/1990 | Jehle | 359/400 |

FOREIGN PATENT DOCUMENTS

| | | |
|---|---|---|
| 0152181 | 8/1985 | European Pat. Off. . |
| 152181A3 | 8/1985 | European Pat. Off. . |
| 0201003 | 4/1986 | European Pat. Off. . |
| 2254007 | 5/1973 | Germany . |
| 452263 | 8/1936 | United Kingdom . |

*Primary Examiner*—Paul M. Dzierzynski
*Assistant Examiner*—Mohammad Y. Sikder
*Attorney, Agent, or Firm*—Lowe, Price, LeBlanc & Becker

[57] ABSTRACT

A surveillance device in the form of a fake radio aerial which projects from the roof of a vehicle. There is an upright periscope in the aerial which can rotate through 360°. In the vehicle the light from the periscope is bent through 90° and viewed by a camera all of which fits in the headliner space of the vehicle and so is not visible.

6 Claims, 2 Drawing Sheets

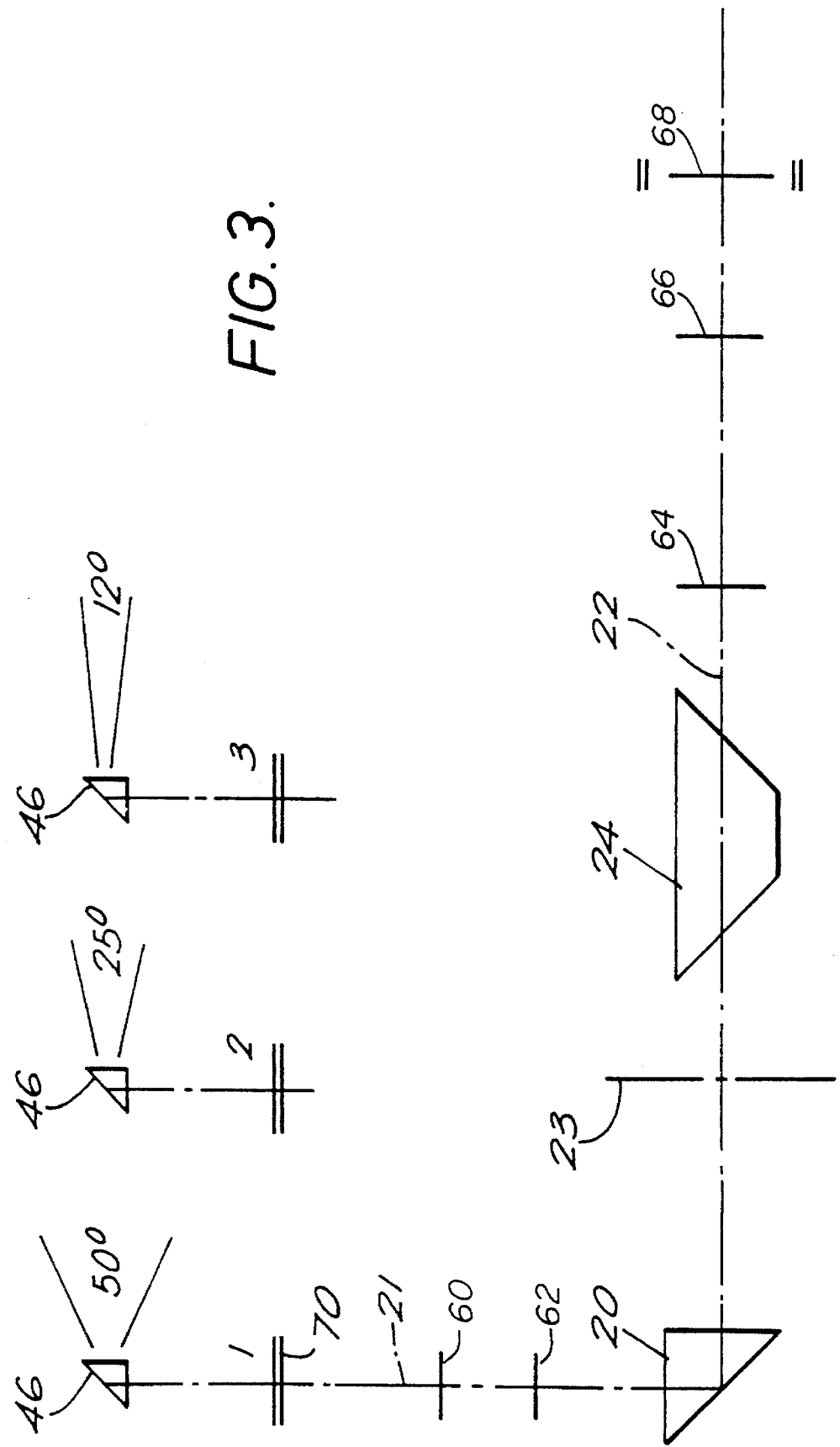

SURVEILLANCE DEVICES

BACKGROUND TO THE INVENTION

Vehicles are often used by security forces, police and the like during surveillance operations. In the simplest form, a vehicle such as a van can be parked at a convenient location and operatives can be housed in the van and view a scene through one-way windows or concealed viewing devices such as a periscope. Simple arrangements such as this are not sufficient, however, with an experienced criminal who will readily spot an unusual vehicle.

As a result remotely controlled camera devices can be used with an empty vehicle like a car. This requires concealment of the camera, recorder and transmission equipment. Again experienced criminals will note anything unusual in a vacant vehicle such as a cushion or paper handkerchief dispenser on the back window sill masking this sort of equipment. Therefore it has been usual to mount such equipment in the boot of a car with a periscope hidden in and masked by a radio aerial. A problem with this arrangement however is that the body of a car and vehicles parked close by will restrict the possible field of view from the aerial to sideways directions and the full 360° will not be available.

Many known surveillance devices such as, for example, that shown in European Patent Application No. 152 181 required that the camera rotate with the periscope making it difficult to rotate the field of view through a complete 360° and to continue to rotate past 360° if required. Also the devices shown in that Application are bulky and would be obvious to a suspect if mounted on the roof of a vehicle.

The invention has therefore been made with these points in mind.

BRIEF SUMMARY OF THE INVENTION

According to the invention there is provided a surveillance device comprising a fake radio aerial, means for mounting this to project from the roof of a vehicle, upright periscope means mounted within a lower part of the aerial, capable of rotation through 360° and of observing a scene from a light inlet in the side of the lower part of the aerial at any orientation relative the fore and aft of the vehicle, means mounted within the interior of the vehicle for receiving light from the periscope, bending the beam at substantially right angles to provide a light path extending substantially parallel to the roof to give an image of the scene at a light outlet to which a camera can be attached, the overall depth of the device within the car being sufficient to fit in the available headliner space within the roof of the vehicle so as not therefore to make any visible internal change to the interior of the roof of the vehicle.

An advantage of the invention is that apart from the provision of an aerial on the roof of the vehicle, something which many vehicles have these days anyhow for things like car telephones, the vehicle will appear to be unaltered both inside and outside and so there need be nothing to make a criminal suspicious. Also it is not necessary for there to be anyone in the car since if desired the device can be operated from a remote location and the picture from the camera transmitted to that remote location for viewing using conventionally readily available technology.

The means which bend at substantially right angles provide a light path which is stationary in the sense that it does not rotate about the axis of the periscope means. Therefore, the light path can be led to a video camera or the like which is fixedly mounted in the headliner space within the vehicle. This has the advantage that the periscope can be rotated as required without having a problem of cover from the video camera being tangled, twisted or torn.

One problem with such a device is that as the periscope means are rotated, the image received by a camera will itself rotate in the plane of the image. Thus in one orientation the image will be upright but at say an orientation displaced 180° the image will be totally inverted. If this is a problem, e.g. when the camera is a video camera, then this can be avoided by either appropriate software operating on the electronic signal from the camera or in a simple mechanical fashion by providing light rotating means such as a dove prism in the light path which is rotated in synchronism with the periscope to provide an equivalent and opposite contra rotation to the light image. In one embodiment of the invention this can be achieved by driving both through suitable gearing from a common electrical stepping motor.

Roads usually have a camber and so if the vehicle is parked, near the curb as it usually will be, the axis of the periscope will be misaligned from a true vertical position. Therefore the scene viewed by the periscope will be higher on the offside of the vehicle than on the nearside. We have found that we can overcome this, however, by arranging for the optical image at the end of the right path to be of a larger size than can be seen by the camera optics and providing means for monitoring the camera so that its optics which view a selected part of the light image can be moved transversally of the light path. In this way one can very easily compensate for the camber of a road by say selectively viewing a lower part of the light image when the periscope is oriented towards the offside of the vehicle and vice versa. Such an arrangement can be quite simple and one can provide a frame to which a camera is to be mounted which can be motor driven to move it transversely of the axis of the light path.

A further incidental advantage of this embodiment of the invention is that because the camera will only view a selected portion of the light path, the image provided by the camera will be enlarged as compared with a camera whose necessary optics exactly match in size the size of the image provided along the light path.

BRIEF DESCRIPTION OF THE DRAWING

The invention will now be described, by way of example, with reference to the accompanying drawings, in which:

FIG. 3 is a diagram showing the optical path within the device.

DESCRIPTION OF THE PREPARED EMBODIMENT

Figure 1:
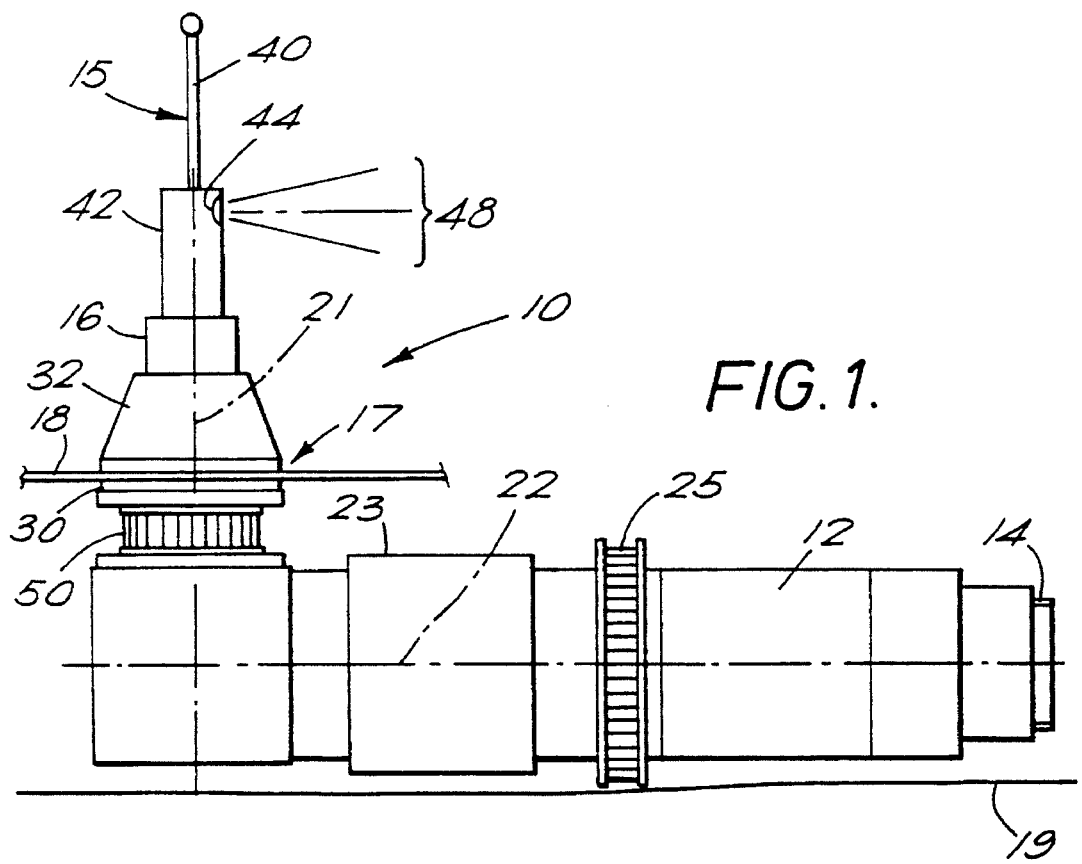
FIG. 1 is a side view of a surveillance device according to the invention.

The surveillance device 10 shown in the drawings comprises a hollow tube 12 which has a light outlet at one end 14 to which a video camera, not shown, can be attached. At its other end it has a fake radio aerial 15 upstanding from a tube 16 fixed at right angles to the tube 12.

The whole device 10 is fitted by attachment means 17 to the roof 18 of a vehicle (not shown) such as a car with the aerial 15 upstanding from the roof. The rest of the device, will fit in the headlining 19 of the roof of the vehicle and so will be invisible and totally hidden by the lining. This is possible because the maximum depth within the vehicle can be as little as say 60 mm.

The tube 12 has at one end a prism 20 for reflecting and bending light from an upright axis 21 to a horizontal axis 22. The housing 12 also includes an electrically controlled iris 23 to control the amount of light entering the camera. However if the camera is a shuttered camera, then the iris can be electrically wired to a fully open position. Following the iris 23 is a dove prism 24 whose purpose will be explained in due course. This is connected to a gear 25 to rotate it.

Above the prism 20 is a stationary flange 30 which abuts the underside of the roof 18 and a frusto-conical threaded flange 32 screws onto the upstanding tube 16. These constitute the attachment means 17 for holding the whole device 10 in place.

Mounted on the tube 16 is the fake radio aerial 15. This comprises a rod 40 and an enlarged base 42 which has an opening 44 in its side. It houses a prism 46 which acts like a periscope and enables the camera to see an image of the area 48 within the field of view. In addition the rod 40 and base 42 can be rotated through 360° to allow viewing in any direction. This is achieved by a gear 50 attached to the tube 16.

Figure 2:
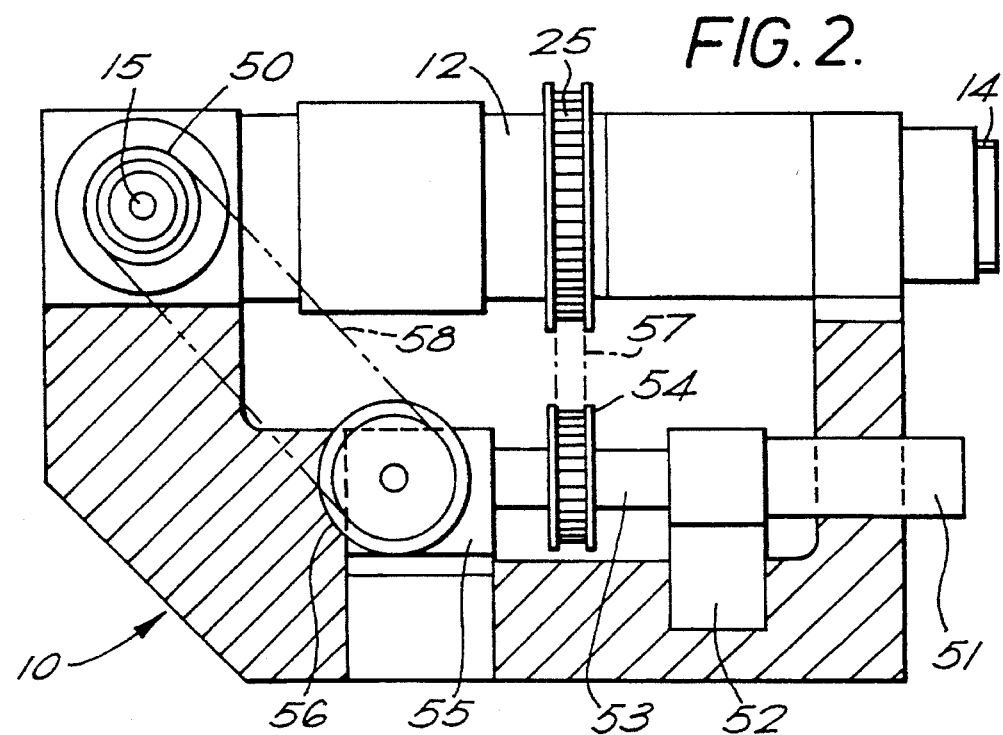
FIG. 2 is a plan view of the device.

As best shown in FIG. 2, an electrical stepping motor 51 is mounted on a holding bracelet 52. It has an output shaft 53 on which a gear 54 is directly mounted. In addition the shaft connects to a gear box 55 which has an output shaft at right angles to the shaft 53 and on this shaft is fixed a gear 56. The gear 54 is connected by a serrated belt 57 to the gear 25 to rotate the dove prism whilst the gear 56 is connected by a serrated belt 58 to the gear 50 to rotate the rod 40 and base 42. The sizing of the various gears is such that the dove prism is rotated at half the rate at which the rod 40 and 42 rotate. In this way by controlling the activation of the motor 51, which can be achieved using a remote signal, one can rotate the aerial 15 to select a desired orientation of view and at the same time rotate the prism 46 to cause the image to rotate in the tube 12 by an exact contra-rotation to that caused by the dove prism. This will therefore maintain the orientation of the image for the camera at the end 14 of the tube 12.

A suitable optical path is provided in the tubes 16 and 12 and correcting lens 60, 62, 64 and 66 provided together with an ocular lens 68 at the end 14 where the camera is mounted. Those will ensure that the image follows an optical path along the axes 21 and 22 with minimum loss of light.

As shown in FIG. 3, one may have say three different fake radio aerials 15 having differing fields of view, e.g. 50°, 25° or 12° and before commencing a particular surveillance an operator chooses and fits in place at the top of the tube 16 the aerial having the required field of view. In that connection it will be noted from FIG. 3 that a plain cover glass 70 is fitted in the top of the tube 16 to prevent any foreign matter from entering the optical system. Further an additional aerial (not shown) without the opening 44 or prism 46 can be fitted in the top of the tube 16 when the vehicle is not conducting a surveillance operation. While the device of the invention has been specifically described by way of a preferred example it will be appreciated that changes and modifications may be made therein without departing from the spirit and the scope of the invention as defined in the appended claims.

I claim:

1. A surveillance device mounted in a vehicle having a roof, a headliner beneath the roof and a space between the headliner and the roof, the surveillance device comprising:

a fake radio aerial;

means for mounting said fake radio aerial to the roof of the vehicle so that said fake radio aerial projects from the roof of the vehicle;

a periscope means attached to a lower part of said fake radio aerial, said periscope means having a light inlet at a lower part of said fake radio aerial;

means for rotating the said periscope through 360° so that the periscope can observe a scene at any orientation relative a fore and an aft portion of the vehicle;

a light outlet provided in said periscope means; and means for bending a beam of light received by said light inlet at substantially right angles to provide a light path extending substantially parallel to the roof and out said light outlet, wherein said periscope means is located between the roof of the vehicle and the headliner of the vehicle at an area wherein the distance between the roof of the vehicle and the headliner of the vehicle is no more than 60 mm.

2. A surveillance device as claimed in claim 1 in which light rotating means are provided in said light path for contra-rotating an image as said periscope means are rotated an equal and opposite amount.

3. A surveillance device as claims in claim 2 in which said light rotating means comprises a dove prism.

4. A surveillance device as claimed in claim 1 in which said fake radio aerial includes a rod shaped upper part and a thicker base, said periscope means being mounted in said base and said light inlet comprising an opening in a side wall of said base.

5. A surveillance device as claimed in claim 4 in which said fake radio aerial is removable and replaceable by another fake radio aerial which has a different field of view.

6. A surveillance device as claimed in claim 1 in which said means for mounting comprise upper and lower clamp members fitted to said fake radio aerial for clamping said device to the roof of the vehicle.

\* \* \* \* \*